(12) United States Patent
Ahopelto (10) Patent No.: US 9,043,432 B2
(45) Date of Patent: May 26, 2015

(54) CONVERTING CONTENT PRIOR TO DELIVERY

(75) Inventor: Timo Ahopelto, Helsinki (FI)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 13/005,613

(22) Filed: Jan. 13, 2011
(Under 37 CFR 1.47)

(65) Prior Publication Data
US 2012/0072529 A1  Mar. 22, 2012

Related U.S. Application Data

(63) Continuation of application No. PCT/EP2009/060895, filed on Aug. 25, 2009.

(60) Provisional application No. 61/091,936, filed on Aug. 26, 2008.

(30) Foreign Application Priority Data

Aug. 26, 2008 (GB) .................................. 0815463.5

(51) Int. Cl.
   *G06F 15/16* (2006.01)
   *H04L 12/58* (2006.01)
   *H04L 29/08* (2006.01)

(52) U.S. Cl.
   CPC ......... *H04L 12/5835* (2013.01); *H04L 12/5855* (2013.01); *H04L 51/066* (2013.01);
   (Continued)

(58) Field of Classification Search
   CPC ............ H04L 12/5835; H04L 12/5855; H04L 67/303; H04L 67/2823; H04L 67/28; H04L 67/306; H04L 67/20; H04L 51/066
   USPC ................ 709/217, 246, 266, 230, 232.241; 707/10, 523; 370/238, 466, 465, 265, 370/217, 246, 266, 230, 232.241; 379/221.06, 93.15
   See application file for complete search history.

(56) References Cited

U.S. PATENT DOCUMENTS 6,965,569 B1 * 11/2005 Carolan et al. ................ 370/238
8,166,131 B2 * 4/2012 Sargaison et al. ............. 709/217
(Continued)

FOREIGN PATENT DOCUMENTS

EP    0660580 A2   6/1995
EP    0 719 016 A2  6/1996
(Continued)

OTHER PUBLICATIONS

Search Report under Section 17 Dated Dec. 22, 2008 issued by the U.K. Intellectual Property Office in a related Great Britain Application No. 0815463.5 (p. 1).
(Continued)

*Primary Examiner* — Thuong Nguyen
(74) *Attorney, Agent, or Firm* — Novak Druce Connolly Bove + Quigg LLP (57) ABSTRACT

A method of managing content format conversion for transmission of converted content to a mobile device includes retrieving initial content, which includes video content, having a first format over a data communications network. The retrieved initial content is analyzed based on an identification of data delivery parameters relating to potential delivery of converted content and a determination is made as to whether or not the data delivery parameters meet predetermined criteria. The format of the initial content is converted to a second format only in response to a determination that the data delivery parameters meet the predetermined criteria. The converted content forms a message body of a message. A conversion management system configured to manage content format conversion for transmission of converted content to a mobile device, and a computer program for performing the method, are also provided.

40 Claims, 4 Drawing Sheets

(52) U.S. Cl.
CPC ............ *H04L 67/20* (2013.01); *H04L 67/2823* (2013.01); *H04L 67/303* (2013.01); *H04L 67/306* (2013.01); *H04L 67/28* (2013.01)

(56) References Cited

U.S. PATENT DOCUMENTS

| | | | |
|---|---|---|---|
| 2003/0009542 A1* | 1/2003 | Kasal et al. | 709/222 |
| 2004/0266411 A1 | 12/2004 | Galicia et al. | |
| 2005/0009541 A1 | 1/2005 | Ye et al. | |
| 2005/0203917 A1* | 9/2005 | Freeberg et al. | 707/10 |
| 2006/0015649 A1* | 1/2006 | Zutaut et al. | 709/246 |
| 2006/0020669 A1 | 1/2006 | Pihlajamaki et al. | |
| 2006/0069808 A1* | 3/2006 | Mitchell et al. | 709/246 |
| 2006/0146124 A1 | 7/2006 | Pepperell et al. | |
| 2008/0049783 A1 | 2/2008 | Habiby et al. | |
| 2009/0215477 A1* | 8/2009 | Lee et al. | 455/466 |
| 2010/0229205 A1* | 9/2010 | Hakusui | 725/62 |

FOREIGN PATENT DOCUMENTS

| | | |
|---|---|---|
| KR | 20070120719 A | 12/2007 |
| WO | WO 2008/048848 A2 | 4/2008 |

OTHER PUBLICATIONS

International Search Report mailed Feb. 17, 2010 issued by the International Searching Authority in a related International Application No. PCT/EP2009/060895 (pp. 3).

* cited by examiner

CONVERTING CONTENT PRIOR TO DELIVERY

This is a continuation Application of International Application No. PCT/EP2009/060895, filed on Aug. 25, 2009, which claimed the priority of Great Britain Application No. 0815463.5, filed Aug. 26, 2008, and the U.S. Provisional Patent Application No. 61/091,936, filed Aug. 26, 2008, the entire content of each of which are incorporated herein by reference.

FIELD OF THE INVENTION

The present invention relates to a method of managing content format conversion for transmission of converted content to a mobile device, a conversion management system arranged to perform such a method, and a computer program for performing the method.

BACKGROUND OF THE INVENTION

Video sponsoring is a dominant advertising format for the internet. Sites such as YouTube™ are starting to generate advertisements added to video content. Online video advertisements are typically "linear" or in-stream advertisements, such as pre-rolls, mid-rolls or post-rolls for the video content, or "non-linear" advertisements, which appear "parallel" to the video content so that users see the advertisement whilst viewing the video content. Examples of non-linear advertisements are video overlays or roll-overs. "Long-form" video advertisements, which typically run for over a minute and are similar to infomercials, are also becoming increasingly popular as an online advertising option. These online advertisements are typically priced on CPM basis, for example £80 for every 1000 advertisements viewed by recipients. Pricing of such ads varies considerably as price is typically defined by auction or by an amount of targeting information available.

Another growing area of interest for advertisers is "mobile marketing," which involves and relates to marketing and advertising via mobile devices, e.g., phones, smart phones, and Personal Data Assistants (PDAs), or any other computer device configured to be able to receive or send data wirelessly, receiving promotional material, i.e., marketing and/or advertising content in the form of, e.g., text, audio, video or some combination thereof associated with a particular product, service or combination thereof. Mobile advertising is advantageous for advertisers, as compared to browsing, actively sending messages to mobile devices guarantees a number of advertisements delivered and viewed, compared to relying on recipients to go online to watch internet advertisements.

Ensuring that a target audience is being effectively exposed to advertising material is a key issue of any advertising or marketing activity, whether it is in the field of direct marketing or brand advertising. Mobile marketing enables advertisers to directly reach individual recipients in a targeted way. This is because the nature of mobile media is personal, in that mobile devices are generally used by a particular individual rather than a group of individuals. Further, mobile media is, by definition, mobile, which offers a transportable mechanism for exposing potential recipients to promotional material. Moreover, because mobile media is "always on", advertisers are not constrained by the need to make a connection in order to deliver promotional material to a user's device because a connection is always established with a user's mobile device (provided the mobile device is in range of an available communication network).

However, there is a cost associated with this targeted distribution of promotional material. Typically the cost is associated with delivery of a direct advertisement message to a targeted individual (i.e., someone who has the attributes identified in an advertising campaign) by direct marketing, or media space in brand advertising. Therefore, an advertiser will attempt to ensure that promotional material is distributed effectively to ensure that the targeted individual is exposed to the promotional material.

The conversion of video content in the form of a video message, for example, WO2008/048848 describes converting a video message to a MMS, the transformation being based on mobile device capability.

It should be noted that a MMS message, that allows sending messages that include multimedia objects (images, audio, video, rich text), is sent in a different manner to a SMS message, which only supports data in the form of text.

SUMMARY OF THE INVENTION

In accordance with at least one embodiment of the invention, methods, systems and software are provided for supporting or implementing functionality to provide processing of a transaction, as specified in the independent claims. This is achieved by a combination of features recited in each independent claim. Accordingly, dependent claims prescribe further detailed implementations of the present invention.

More particularly, aspects of the invention provide a method of managing content format conversion for transmission of converted content to a mobile device, the method comprising the steps of:

retrieving initial content, which includes video content, having a first format over a data communications network;

analysing the retrieved initial content based on an identification of data delivery parameters relating to potential delivery of converted content, including determining whether or not the data delivery parameters meet predetermined criteria; and converting the format of the initial content to a second format only in response to a determination that the data delivery parameters meet the predetermined criteria, said converted content forming a message body of a message.

Embodiments of the present invention involve conversion of the format of existing video content, such as streamed online video content, a video message or a television program to a second format, such as MMS format by analysing the content based on whether or not it would meet certain criteria if it were to be converted, before such a conversion takes place; the conversion will only take place if the criteria are met, that is, if the conversion is worthwhile based on certain data delivery parameters. Unnecessary conversion is therefore avoided by efficient management of the format conversion.

In some embodiments, the message further comprises transmission data identifying the mobile device, for transmission of the message to the mobile device.

In some embodiments, the method comprises generating the message for transmission to the mobile device. Thus, the message body is combined with transmission data associated with the intended recipient mobile device, such that a message is generated and ready to transmit to the mobile device.

In some embodiments the method includes transmitting the message to the mobile device, either directly, or via a third party transmission service, such as may be provided by a network operator.

In some embodiments, analysing the retrieved initial content includes determining whether resource usage allocation associated with the initial content exceeds resource usage requirements of the converted content, the format of the initial content being converted when the resource usage allocation exceeds resource usage requirements. This ensures that messages are not converted and ultimately sent unless it is worthwhile in terms of resource usage.

In other embodiments, analysing the retrieved initial content includes analysing capabilities of the mobile device, the format of the initial content being converted if the mobile device is capable of receiving and processing the converted content in the second format. This avoids unnecessarily sending messages to mobile devices which do not have the capability to receive and process content in the second format, and hence avoids converting and sending content which could not be viewed by a recipient if sent.

In yet further embodiments, analysing the retrieved initial content includes comparing the data size of the message with a maximum data size that the mobile device is capable of receiving and processing, the format of the initial content being converted if the mobile device is capable of receiving and processing the message. This avoids unnecessarily sending messages which are too large to mobile devices that are incapable of receiving and processing them, and hence again avoids converting and sending content which could not be viewed by a recipient if sent.

In some embodiments, analysing the retrieved initial content includes analysing network resources of a data communications network over which the message is transmitted, the format of the initial content being converted if network resources for transmitting the message are available. This ensures that network resources are used efficiently and that network overload is avoided.

In other embodiments, analysing the retrieved initial content includes analysing message preference settings stored in a user profile of a potential recipient mobile device, the format of the initial content being converted if the transmission of the message to the mobile device complies with the message preference settings. In this way, if a user has specified a maximum number of messages that he or she is willing to receive, this can be monitored to ensure that the content is not converted, and that the corresponding message is not sent, if this maximum has been met.

Alternatively or additionally, analysing the retrieved initial content can include analysing one or more parameters related to a user profile associated with the mobile device, the format of the initial content being converted if the initial content relates, in a predetermined manner, to the one or more parameters. Thus content will only be converted if it is relevant to users according to their profile, ensuring the transmission of relevant content to specific users.

In some embodiments, analysing the retrieved initial content can include analysing one or more parameters related to a user profile or geographical location associated with a group of mobile devices, the format of the initial content being converted, for transmission to one or more mobile devices within the group, if the initial content relates, in a predetermined manner, to the one or more parameters. In this way, relevant content can be targeted at groups of users.

In some embodiments, the initial content includes auxiliary content, said auxiliary content originating from a content inventory. Auxiliary content can therefore be converted alongside the video content and included in any transmitted message.

In other embodiments, the initial content is in the format of video content, the data communications network over which the video content is retrieved being an IP network, and the converted content is in a multimedia messaging service (MMS) format, the message being transmitted via a telecommunications network.

In some embodiments, the initial content is streamed video content.

In some embodiments, the initial content is compressed during conversion such that when it is converted, it has a data size capable of being received and processed by an intended recipient mobile device.

Alternatively or additionally, according to some embodiments, during conversion, the video content of the initial content is separated to provide converted content forming multiple message bodies of respective multiple messages, for transmission to the mobile device. The transmission of said multiple messages is preferably directed according to a predetermined content delivery schedule.

Aspects of the present invention further provide a conversion management system configured to manage content format conversion for transmission of converted content to a mobile device, the system comprising a processor arranged to:

retrieve initial content, which includes video content, having a first format over a data communications network;

analyse the retrieved initial content based on an identification of data delivery parameters relating to potential delivery of converted content and determine whether or not the data delivery parameters meet predetermined criteria; and convert the format of the initial content to a second format only in response to a determination that the data delivery parameters meet the predetermined criteria, said converted content forming a message body of a message.

Aspects of the present invention further provide a method of managing content format conversion for transmission of converted content to a mobile device, the method comprising the steps of:

identifying an allocation of resource usage available for the delivery of messages of a first format; and performing a process comprising the steps of:
selecting data of a second format from a plurality of candidate said data, said data comprising video content; and
analysing the selected candidate data based on an identification of data delivery parameters relating to potential delivery of said selected candidate data when converted to a message of said first format, so as to identify actual resource usage for said converted message, in which, in the event that said actual resource usage exceeds a predetermined amount of the identified resource usage allocation, the method comprises performing said process in respect of another said candidate data.

Embodiments of the present invention further provide a computer program, or a suite of computer programs, comprising a set of executable instructions arranged to cause a computer, or a suite of computers, to perform the above method, and a computer readable medium comprising the computer program.

Further features and advantages of the invention will become apparent from the following description of preferred embodiments of the invention, given by way of example only, which is made with reference to the accompanying drawings.

DETAILED DESCRIPTION OF THE INVENTION

Figure 1:
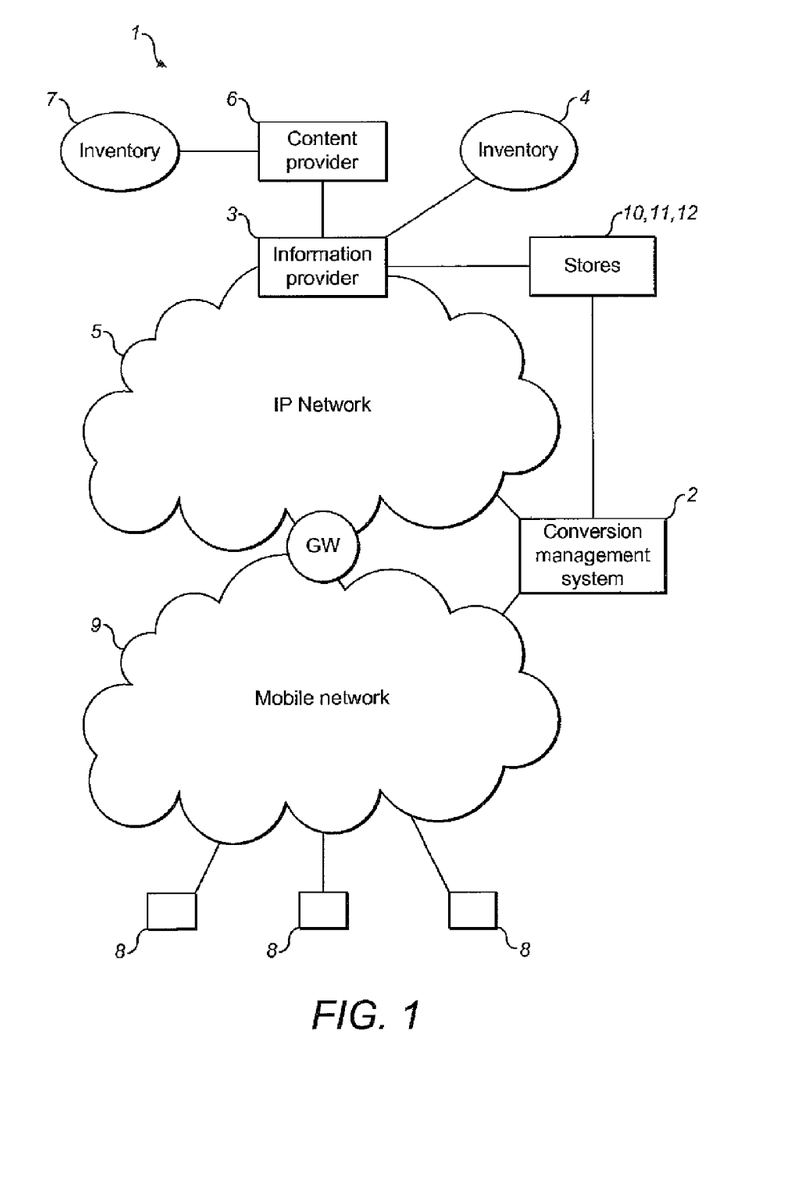
FIG. 1 shows an example of a distribution network, including a conversion management system according to the present invention.

Referring to FIG. 1, a data distribution network 1 employs a conversion management system 2 according to the present invention. One or more information providers 3, at least some of which are arranged to store content and information in one or more content inventories 4 associated therewith, are connected to a data communications network 5 either directly or indirectly (e.g. via the Internet, local area networks (LANs), other wide area networks (WANs), and regional networks accessed over telephone lines, such as commercial information services). The distribution network 1 also includes one or more content providers 6 such as advertisers, defined to include any and all entities or individuals that want to provide information relating to products or services to recipients interacting with a given information provider 3. The content providers 6 can provide the information providers 3 with content, such as video or other advertising content, from one or more content inventories 7 associated therewith; additionally or alternatively, an information provider 3 may access its own content inventory 4. Advertising content may take the form of a video advertisement, which can be viewed as a stand-alone piece of content or as a pre-, mid- or post-roll to associated video content, or may alternatively comprise any other form of advertising content suitable for association with video content.

Mobile terminals 8 are adapted to communicate with the various information providers 3 via a mobile network 9 and an appropriate gateway GW, as shown; the mobile terminals 8 can be mobile telephones or PDAs, lap top computers and the like, and the mobile network 9 can comprise, for example, cellular networks using e.g. Global System for Mobile Communications (GSM) technology, Wideband Code Division Multiplex Access (WCDMA); Code Division Multiplex Access (CDMA), WiMax) and/or network portions such as Wireless LANs and Bluetooth technologies. The gateway GW can be a GPRS support node (GGSN) fanning part of the mobile network 9. In this way, information can be sent directly between the information providers 3 and the mobile terminal 8 when required. Some embodiments of the invention may be also deployed to work with other mobile packet data services, e.g. services deploying Evolution-Data Optimized (EVDO) standard.

The conversion management system 2 is arranged to manage a content format conversion for transmission of converted content to a mobile device 8 or mobile terminal, so that only advertisements that are worth sending, in terms of resource usage, are re-formatted, or "packaged", into multimedia messages for sending to mobile devices 8 through the mobile network 9, as described further below.

It is preferable that MMS messages are only sent to the mobile devices 8 of targeted mobile recipients, or alternatively to recipients who have opted in to receive the related content. In a preferred arrangement, an advertisement is selected based on at least one parameter related to a user profile associated with the intended recipient mobile device 8. The parameter is preferably selected from a store 10 of selectable data related to the user profile. A further store 11 holds an inventory of known mobile device capabilities, while store 12 holds data relating to sent messages.

Figure 2:
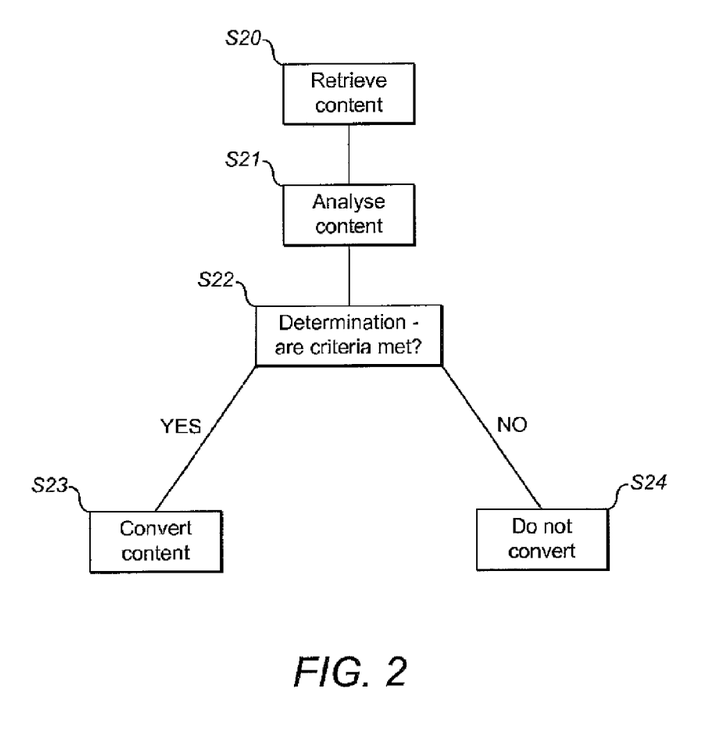
FIG. 2 is a flow diagram of the processes carried out by the conversion management system according to the present invention.

Referring to FIG. 2, in a preferred arrangement, the conversion management system 2 comprises a processor which retrieves (S20) initial content, which initial content includes video content such as a television program in the form of streamed online video content or an advertisement movie or clip, over an Internet network 9. This retrieval may occur, for example, passively, i.e. automatically based on a content delivery campaign of the information provider 3, or actively, for example, in response to a request received by the information provider 3 from an advertiser 6 or a user of a mobile device 8. Thus, the initial content is sourced by the conversion management system 2 from the information provider 3, and includes video content. The initial content may be in the form of at least one advertisement, which may be a video advertisement itself, such as a long-form video advertisement; in another, the advertisement is auxiliary content which is associated with, for example embedded into, the video content. The auxiliary content may be associated with the video content upon retrieval thereof, or may be appropriately associated with the video content during subsequent conversion of the initial content to a second format such as MMS.

After retrieving this initial content, it is analysed (S21) by the conversion management system 2 based on an identification of delivery parameters relating to potential delivery of converted content. The analysis provides a way of assessing whether or not it is worthwhile converting the initial content, such as a streamed online video advertisement, into MMS format before such conversion takes place.

Upon determination (S22) that data delivery parameters relating to potential delivery of converted content meet predetermined criteria, the online video content is converted (S23) or transformed to MMS format content. The MMS delivery cost can include various factors such as standard charges for transmitting the message over a certain mobile network 9, which may differ between different network operators, and charges based on the size of the MMS data. In this case, available resource usage allocation is most effectively used when MMS messages are sent via a less costly network operator when a choice of recipients, at least some of whom are associated with different network operators, is available to the information provider 3 or content provider 6.

The converted content forms a message body of the MMS, which in one embodiment also includes transmission data identifying a recipient mobile device 8 that the MMS is to be sent to over the mobile network 9.

In one example, the conversion management system 2 is arranged to generate and/or send the MMS, and in an alternative example the information provider receives the converted content from the conversion management system, combines this with transmission data and sends the MMS to the mobile device. Once it has been determined that the format conversion should take place, the conversion and sending of the MMS is preferably performed automatically. The message may be transmitted either directly, or via a third party transmission service, such as may be provided by a network operator.

Linking automatic content conversion and sending, as described above, to existing and available inventories of video-related advertisements in the internet, enables access to incredibly large inventories of advertisements for use in mobile advertising, greatly increasing the choice and availability of advertising content over the mobile network 9.

The application of the conversion management system 2 to streamed video content is particularly advantageous, as streamed content is a commonly employed medium for online content, be it advertising content itself or that having advertising embedded therein, providing online advertisers and information providers 3 with vastly increased access to potential customers via the mobile network 9.

In one embodiment, the conversion management system 2 is arranged to compare resource usage requirements of the retrieved content if it were converted and sent, that is, requirements relating to resources used in delivering the retrieved content as a MMS message across the mobile network 9, with resource usage allocation, that is, the resources made available to the information provider if they are to use the advertisement. Only when the resource usage allocation is determined to exceed the resource usage requirements is the retrieved content selected by the system 2 for conversion. Preferably, content that maximizes the resource usage allocation of the information provider is converted, in the case where a choice of initial content is available.

In one arrangement, video content is converted by the conversion management system 2 and messages are generated and sent to recipient mobile devices 8 automatically and immediately when, for example, resource usage allocation that an advertiser 6 has determined for the advertisement exceeds the resource usage required by the information provider 3; in an alternative arrangement, messages are transmitted to a group of recipients at a specified time, according to the information provider's 3 content delivery schedule.

At present, a user can browse the internet and access sites such as YouTube™, where it is possible to view streamed videos for free. However, in the case of sending advertisements and associated content as MMS messages via a mobile network 9, an information provider 3 is typically charged per message, per size of the message (i.e. the amount of data included therein) or a combination thereof, by a mobile network operator. For example, if an information provider 3 such as Google™ wishes to send out a 200 kB video to a mobile device 8, but the mobile network operator charges 0.05 p/kB for the data, i.e. 10 p in total, to send this content in the form of an MMS message, Google™ must charge an advertiser 6 providing the advertisement over 10 p, in order to make sending the message worthwhile.

Typically sending of a MMS is charged using a flat rate per message, irrespective of the data size thereof. However, subject to agreements between an information provider and an operator, the content provider could negotiate a different pricing structure dependent on the data size of the message. In the case of Google™ using its own inventory 4, in which advertisements have already been purchased for use, efficient resource usage is again a key issue.

The conversion management system 2 is advantageous as it only converts, and optionally "packs", the content (and associated advertisements) into MMS messages, when this is deemed worthwhile, based on a determination, made before conversion occurs, that data delivery parameters of the converted content will meet certain criteria if the conversion goes ahead.

Another preferred feature of the conversion management method and system 2 is that the system allows for allocation of a generated message only to recipients whose mobile devices 8 are capable of receiving the message that results from the conversion, by analysing mobile device 8 capabilities before any conversion takes place. For example, some mobile devices are not capable of receiving MMS messages, but a user may unwittingly request such a message, or the mobile device may be included in a content delivery schedule in error. Therefore, if a mobile device 8 has no capability to receive and process content in the second format, conversion to the second format will not be performed by the conversion management system 2, to avoid unnecessary conversion and sending of content which could not be viewed by a recipient if sent.

Additionally, the conversion management system 2 can be configured to consider the size of each individual MMS message to be sent, to allow for a case where the mobile device 8 is capable of handling MMS messages of a limited size. In this case the conversion depends on a comparison between the data size of the MMS message and a maximum size of an MMS that the intended recipient mobile device 8 can receive and process. In this case, conversion will be ruled out in the case where the device 8 is unable to receive or process the MMS. For example, in relation to sizes of messages above 100 kB, some mobile devices 8 are capable of receiving and processing only 100 kB, the processing of such larger messages and would therefore be ruled out by the conversion management system 2 as possible recipient mobile devices 8 for a generated MMS message. The specific threshold will depend on the device 8 capabilities on an individual basis. This avoids unnecessarily sending messages which are too large to mobile devices that are incapable of receiving and processing them, and hence again avoids converting and sending content which could not be viewed by a recipient if sent.

Figure 3:
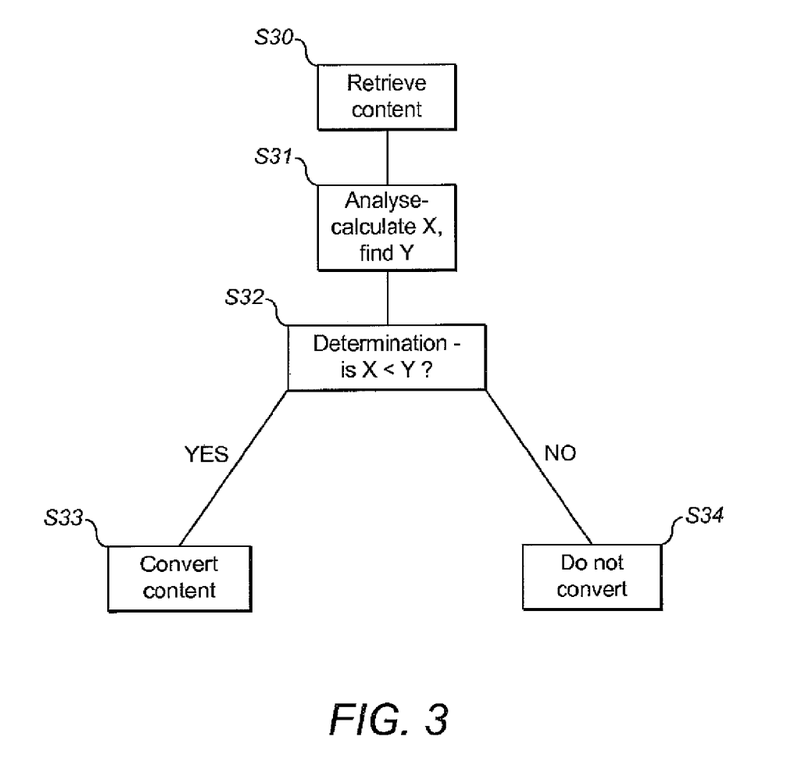
FIG. 3 is a flow diagram showing an example in which the format of content is converted if a mobile device is capable of receiving and processing a message comprising the converted content based on the data size thereof.

In order to implement the functionality described above, the conversion management system has access to an inventory of mobile device 8 capabilities in the form of a store 11, such as a database. Typically, mobile device 8 capabilities are captured by a mobile device 8 ID (the IMEI number) when a user of the mobile device 8 subscribes to a distribution service, and the device ID, along with the device capabilities, are stored in the database 11 for future use. Alternatively, a standard request message may be sent from the conversion management system 2 to a potential recipient mobile device 8, requesting the device parameters. An example of this embodiment is shown in FIG. 3. The conversion management system 2 retrieves (S30) initial content, such as a video clip from a sporting event, together with auxiliary content in the form of a static overlay or roll-over advertisement for a sale of sports equipment via a certain website. An intended recipient mobile device 8 may already be specified, for example, the system or information provider may have initiated the process based on a user request, or based on a predetermined content delivery schedule of the information provider 3 or an associated content provider 6.

In analysing (S31) whether the content format should be converted for transmission to a recipient mobile device 8, the conversion management system 2 calculates the data size X of a potentially generated message, including the message body with converted content and the transmission data for sending the message to the mobile device 8. Furthermore, the conversion management system 2 accesses a device capability database 11, from which it is able to find information as to the maximum data size Y that the specific mobile device 8, to which it is intended to send the message, is capable of receiving and processing. The system 2 then compares these results to determine (S32) whether or not the content should be converted. If X is less than Y, it is determined that the mobile device 8 is capable of receiving the message, and the system 2 automatically proceeds with converting (S33) the content. In this case, the conversion includes embedding the auxiliary content in the video content and converting the content to MMS format. However, if X is greater than Y, the message data size is determined (S34) to exceed the maximum size capability of the mobile device 8 and, in a first scenario, conversion will not take place. The user request will then be refused, or the system 2 will consider another mobile device that has been pre-selected by the information provider 3 or associated content provider 6 in accordance with their content delivery schedule. Such a content delivery schedule could be agreed to by a user; for example, a user could subscribe to a certain service whereby they agree to receive a certain number of MMS messages, incorporating advertising content in association with video content, per day.

The above example can also be applied to video advertisements i.e. video content which is itself an advertisement, for conversion into content of a second format that forms a MMS message body.

In one arrangement, the conversion process can involve compressing or selectively editing the initial content such that when it is converted, it has a data size capable of being received and processed by an intended recipient mobile device 8. In one example, a single video clip can be converted to form the message body of MMS messages having different sizes, depending upon the recipient device capabilities. For example, only selected parts of the video can be converted, while unnecessary parts are discarded by the conversion management system 2. Interframe compression, which uses one or more earlier or later frames in a sequence to compress the current frame, or intraframe compression, which uses only the current frame and is effectively image compression, can be employed.

Compressing or selectively editing the video content results in a loss in quality of the video content; however, such a loss may be acceptable if, without compression, the message could not be transmitted to a mobile device 8 at all. Additionally, in many cases, the processing and/or display capabilities of mobile devices 8 may in any case be limited, such that the reduction in data size will not be a strong contributing factor to the perceptual quality of images viewed by a user on their mobile device 8. Additional factors that can be varied during conversion, to allow the converted content to be sent to different recipients whose mobile devices 8 have different capabilities, are bit rate and/or resolution.

In another arrangement, it is possible to convert initial content which, as converted content, forms more than one message body, thereby providing for more than one MMS message to be sent, per video "item" to be converted. This is advantageous when the size of the converted data is too large for one MMS message, or is too large for a particular mobile device 8 to receive and process. This arrangement is additionally advantageous where it is desired to avoid a reduction in quality by reducing the data size of the MMS, as described above. In this case it is necessary to generate and send as many MMS messages as are required to carry all of the video content. The number of MMS messages sent in this case will in general be proportional to the size of the video item. Since the resource usage criteria constraints are applied per message, the number of MMS messages that will be required if the content is converted is considered during the analysis of resource usage criteria.

An example of the above arrangement in which multiple MMS messages are required to pack the converted content relating to one video item, is a video clip which contains multiple scenes, where each scene can be sent, in its converted content format, as the message body of a separate MMS message. In such a case, the system is further arranged to separate the video content of the initial content, during conversion, to provide converted content forming multiple message bodies of respective multiple messages, for transmission to the mobile device.

The system 2 is preferably arranged to direct the transmission of the multiple messages according to a predetermined content delivery schedule, either of the information provider 3 or the content provider 6. This can mean that the conversion management system 2 sends the messages itself, or alternatively that it directs the transmission of the messages by another component of the distribution network 1 that is operably connected to the system 2. Conversion will preferably take into account points in the video item at which a split provides minimal interruption to the video viewing, e.g. between scenes in the above example. The sending of separate messages can be timed in association with the content delivery schedule of the information provider 3 or the content provider 6, for example, one MMS message may be sent per day or per week. Additionally, conversion can be dependent on resource usage to the extent that higher quality conversion (i.e. conversion and packing into MMS messages having a larger data size) is performed where the intended recipient has subscribed to a contract specifying that no restriction should be made on the size (and hence quality) of content in the AIMS messages sent; such a subscription is preferably recognised and taken into account by the conversion management system 2 when considering whether or not to convert the content.

In one arrangement, the conversion management system 2 analyses network resources of the mobile network 9 when considering whether the content format conversion is worthwhile. For example, the system can analyse whether there is spare capacity in the mobile network 9 which is not being used for any other purpose, and uses this network capacity to send the MMS messages over the mobile network 9 at appropriate times. This ensures that network resources are used efficiently and that network overload is avoided. In an alternative arrangement, analysis of the network resources is performed by a separate component within the distribution network 1, which component is operably connected to the conversion management system 2 for transmitting data relating to network capacity to the conversion management system.

Mobile device 8 users may be required to subscribe to a content distribution service in order to receive video content converted to MMS messages according to embodiments of the invention; subscription can be performed by entering data into a WAP page that is downloaded to the user's mobile device 8 or by entering data by means of a data gathering application running on the device. Alternatively, mobile device 8 users can subscribe to a content distribution service by browsing, with a browser application used in a mobile terminal 8, to a web page and entering required details. Subscribing can involve registering personal characteristics and statistics, and explicitly consenting to receiving MMS messages.

The parameter used in selecting the video content, where this is an advertisement, or the auxiliary content to be associated with video content, can be related to one or more of these personal characteristics, such as age, occupation, preferences, context (work, play) etc.; or related to environmental factors such as time of day, day of the week etc. Alternatively the parameter can be selected at random. Preferably the method includes keeping a track of data that have been selected, so as to ensure that the same data are not sent to the same recipient mobile device 8, and hence the same user, twice.

Figure 4:
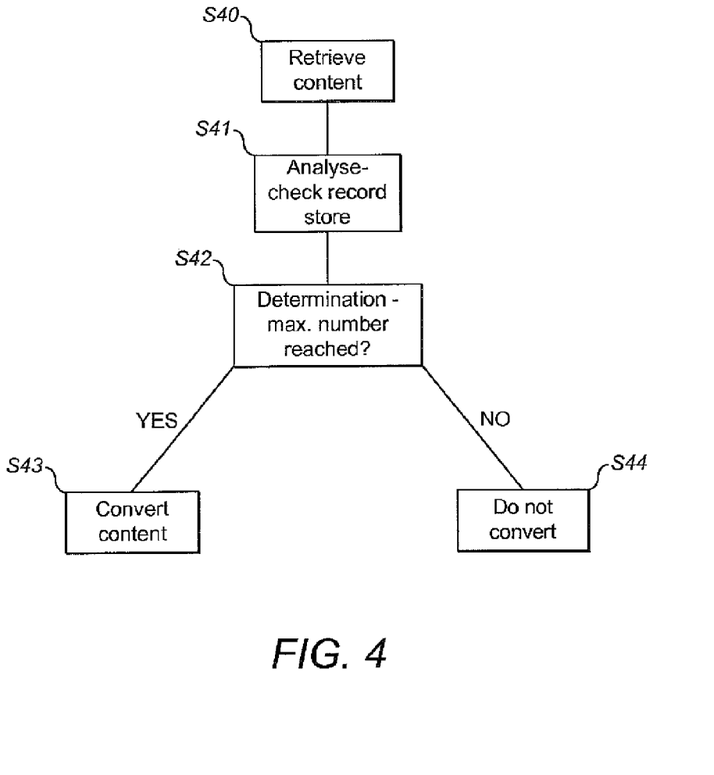
FIG. 4 is a flow diagram showing a further example in which the format of content is converted if a message comprising the converted content complies with message preference settings of a user profile of the device user.

The parameter may be related to message preference settings set by the user, and may comprise a value indicating a number of MMS messages that a mobile device 8 user is willing to receive in a certain period of time. Referring to FIG.

4, initial content is retrieved (S40) by the conversion management system 2. In this case, the step of analysing (S41) includes checking how many messages the mobile device 8 has already received by accessing a sent messages record store 12, in which the number of messages sent to a particular mobile device 8 is stored. The system 2 determines (S42) whether or not the maximum number set by the user has been reached by comparing the number of sent messages recorded with the maximum number stored in the a user profile database 10, and converts (S43) the data in the event that the specified number has not been exceeded. In the event that the specified number has been met or exceeded, the content conversion is not carried out (S44).

In a preferred embodiment, an information provider 3 or advertiser 6 selects a group of targeted recipients based on e.g. recipient profiles or geographical location, and parameters for conversion are selected so that one or more MMS messages can be sent to whole group or some part of the group.

Relevant customer profile data may be stored in one or more data stores 10, such as databases, to which the information provider 3 and/or the conversion management system 2 have access. In order to enable personalized selection of the auxiliary content, the databases 10 may include data describing preferences, time of day, location, occupation, context etc. This therefore provides a means of selecting auxiliary content that is suited to the user of the recipient mobile device 8.

The step of analysing one or more parameters relating to a user profile can include analysing data on the basis of a further parameter which may be related to the location of the recipient mobile device, and hence its user. Thus, for example, if the location of the recipient device is identified to be in the vicinity of a football ground, the retrieval of initial content determined that it is appropriate to send content relating to football to the device, and hence converts appropriate initial content.

In a preferred arrangement, advertisements in the form of video or auxiliary content are inserted dynamically into messages during the conversion, based on combining a mobile device 8 user's profile that matches targeting criteria of an advertisement. Advertisements may be embedded as a pre-roll, mid-roll, post-roll, roll-over or overlay to video content.

The invention may typically be implemented as follows. A first server, which is typically server accessed by users over the internet (e.g. a server owned by Google™, Yahoo™ etc.), can contain video advertisements. A second server contains a system according to an embodiment of the present invention, and this server connects to the first server over the internet to retrieve, analyse and convert suitable videos to MMS messages. The second server or a third server may manage scheduling of sending of the converted MMS messages to recipients, who may be targeted/selected by the second server, the third server or a fourth server.

A computer program in the conversion management system 2 can maintain the stores or databases 10, 11, 12 or enable access to these when needed.

A computer program to implement the above retrieval, analysis and conversion by the processor of the system 2 may be embodied on computer-readable media and arranged to interface with the information provider 3.

Several computer programs resident on computer-readable media may be used in the invention. One computer program is resident in the conversion management system 2 and retrieves initial content form the information providers 3. Another computer program may be resident in the information provider 3 and manages interaction with advertisers such as reception of advertisements from the advertisers, data about advertising delivery schedules from the advertisers, receives requests from mobile terminals 8 for advertisements to be associated with communications, e.g., web or WAP pages, being delivered to users' mobile terminals 8, analyzes the requests and provides suitable advertisements, and enables retrieval of the content by the conversion management system 2.

In the context of this document, computer-readable medium could be any means that can contain, store, communicate, propagate or transmit a program for use by or in connection with the methods or systems described above. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fibre, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

The above embodiments are to be understood as illustrative examples of the invention. Further embodiments of the invention are envisaged. For example, the video and/or auxiliary content may be pre-packaged rather than streamed data, for example in the form of a video message.

In some embodiments, an allocation of resource usage available for the delivery of MMS messages can be identified, and subsequently to this, initial content, including video content, can be selected based on the available allocation. The selected data can then be analysed based on an identification of data delivery parameters relating to potential delivery of said selected candidate data when converted to a message of said first format, so as to identify actual resource usage for the converted message. In the event that the actual resource usage exceeds a predetermined amount of the identified resource usage allocation, conversion of the format of the content does not take place for this specific initial content, and the steps of selecting and analysing can be carried out in respect of another item of initial content (including video data).

This process can be repeated for specific initial content until it is determined that the actual resource usage is less that the predetermined amount of the identified resource usage allocation, in which case conversion to MMS format is automatically carried out.

In some embodiments, for example, the content format conversion management can involve the information provider 3 or content provider 6 identifying a group of intended recipient mobile devices 9 to the conversion management system 2. The conversion management system receives this information and is able to access, from the mobile device capability store 11, details as to the mobile device 8 capabilities of the devices to which the messages of converted content are intended to be sent. Actual resource usage allocation can be identified on the basis of the collective receiving capabilities of said at least some plurality of recipient mobile devices.

In one arrangement, the system 2 identifies the mobile device 8 of the group which is capable of receiving messages of the most limited size. Conversion is then carried out on this basis, that is, the initial content is compressed during conversion so that all of the messages sent are of the minimum capability of the group. This ensures that all of the mobile devices 8 within a specific group are capable of receiving intended converted content, but that the conversion process is as efficient as possible. As a further alternative, only the capabilities of terminals of a specified number of recipients in the group are analysed. Members of the group can be selected based on a random number or a predetermined number, and may be selected at random for the group or on the basis of specified characteristics of the recipient, such as their specific mobile device 8 capabilities.

Alternatively, conversion can take place depending on the individual capabilities of each mobile device 8 of the group, to ensure that the content received by each mobile device 8 of the group is of an optimised quality based on the device 8 capabilities. Again, alternatively, only the capabilities of terminals of a specified number of recipients in the group are analysed. Members of the group can be selected based on a random number or a predetermined number, and may be selected at random for the group or on the basis of specified characteristics of the recipient, such as their specific mobile device 8 capabilities.

The groups may be chosen or identified based on a parameter of a user profile associated with each mobile device 8, or based on a parameter relating to the geographical location of each mobile device 8, which data may be accessible from a store 10 of user profile data, as explained previously, and/or the home location register (HLR), which stores the location of mobile devices.

The extent of compression during conversion can also be determined based on resource usage requirements, in order to ensure that the transmission of messages is effectively prioritised. For example, where the resource usage requirements decrease with the data size of the message, and there are a certain number of mobile devices 8 within a group, the conversion management system can manage the level of compression to ensure that as many as possible of the mobile devices 8 of the group receive a message whilst ensuring that resource usage is efficiently managed.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
   retrieving, by a processor, over a data communication network, an initial content in a first format, wherein the initial content includes video:
   determining, by the processor, a resource usage requirement associated with delivering the initial content in a converted format to a mobile device, wherein:
   the converted format is different than the first format;
   the resource usage requirement indicates a delivery cost to deliver the initial content in the converted format over the data communication network, and
   the delivery cost is calculated based on:
      a data size of the initial content in the converted format, and
      a mobile network operator charge for delivering data over the data communication network;
   upon a determination that the delivery cost does not exceed a monetary amount specified by an information provider for delivery of content to the mobile device, converting the initial content to the converted format; and
   transmitting a message including the initial content in the converted format to the mobile device.

2. The method of claim 1, wherein converting the initial content includes selectively editing the initial content by compressing select portions of the video content and discarding unnecessary portions of the video content.

3. The method of claim 1, wherein the message further comprises transmission data identifying the mobile device, for transmission of the message to the mobile device.

4. The method of claim 1, further comprising:
   generating the message for transmission to the mobile device.

5. The method of claim 1, further comprising:
   analyzing capabilities of the mobile device, wherein the initial content is converted only if the mobile device is capable of receiving and processing the initial content in the converted format.

6. The method of claim 1, further comprising:
   comparing the data size of the initial content in converted format with a maximum data size that the mobile device is capable of receiving and processing, wherein the initial content is converted only if the mobile device is capable of receiving and processing the initial content in converted format.

7. The method of claim 6, wherein converting the initial content includes compressing the initial content to a data size capable of being received and processed by the recipient mobile device.

8. The method of claim 1, further comprising:
   analyzing network resources of the data communication network, wherein the initial content is converted only if network resources for transmitting the message are available.

9. The method of claim 1, further comprising:
   analyzing message preference settings stored in a user profile of the mobile device, wherein the initial content is converted only if transmission of the message to the mobile device complies with the message preference settings.

10. The method of claim 1, further comprising:
    analyzing one or more parameters related to a user profile associated with the mobile device, wherein the initial content is converted only if the initial content relates, in a predetermined manner, to the one or more parameters.

11. The method of claim 1, wherein determining a geographical location of the mobile device, wherein the initial content is converted only if the mobile device is within a predetermined area.

12. The method of claim 1, wherein the initial content includes auxiliary content, said auxiliary content originating from a content inventory.

13. The method of claim 1, wherein the initial content is video content and the data communications network over which the initial content is retrieved is an IP network.

14. The method of claim 1, wherein the initial content is streamed video content.

15. The method of claim 1, wherein converting the initial content includes separating the initial content into multiple message bodies of respective multiple messages, for transmission to the mobile device.

16. The method according to claim 15, wherein transmission of the multiple messages is directed according to a predetermined content delivery schedule.

17. A system comprising:
a processor; and
a memory containing instructions that, when executed, cause the processor to:
retrieve, over a data communication network, an initial content in a first format, wherein the initial content includes video;
determine a resource usage requirement associated with delivering the initial content in a converted format to a mobile device, wherein:
the converted format is different than the first format;
the resource usage requirement indicates a delivery cost to deliver the initial content in the converted format over the data communication network, and
the delivery cost is calculated based on:
a data size of the initial content in the converted format, and
a mobile network operator charge for delivering data over the data communication network;
upon a determination that the delivery cost does not exceed a monetary amount specified by an information provider for delivery of content to the mobile device, convert the initial content to the converted format; and
transmit a message including the initial content in the converted format to the mobile device.

18. The system of claim 17, wherein converting the initial content includes selectively editing the initial content by compressing select portions of the video content and discarding unnecessary portions of the video content.

19. The system of claim 17, wherein the message further comprises transmission data identifying the mobile device, for transmission of the message to the mobile device.

20. The system of claim 17, wherein the instructions further cause the processor to:
generate the message for transmission to the mobile device.

21. The system of claim 17, wherein the instructions further cause the processor to:
analyze capabilities of the mobile device, wherein the initial content is converted only if the mobile device is capable of receiving and processing the initial content in the converted format.

22. The system of claim 17, wherein the instructions further cause the processor to:
compare the data size of the initial content in converted format with a maximum data size that the mobile device is capable of receiving and processing, wherein the initial content is converted only if the mobile device is capable of receiving and processing the initial content in converted format.

23. The system of claim 22, wherein converting the initial content includes compressing the initial content to a data size capable of being received and processed by the recipient mobile device.

24. The system of claim 17, wherein the instructions further cause the processor to:
analyze network resources of the data communication network, wherein the initial content is converted only if network resources for transmitting the message are available.

25. The system of claim 17, wherein the instructions further cause the processor to:
analyze message preference settings stored in a user profile of the mobile device, wherein the initial content is converted only if transmission of the message to the mobile device complies with the message preference settings.

26. The system of claim 17, wherein the instructions further cause the processor to:
analyze one or more parameters related to a user profile associated with the mobile device, wherein the initial content is converted only if the initial content relates, in a predetermined manner, to the one or more parameters.

27. The system of claim 17, wherein the instructions further cause the processor to:
determine a geographical location of the mobile device, wherein the initial content is converted only if the mobile device is within a predetermined area.

28. The system of claim 17, wherein the initial content includes auxiliary content, said auxiliary content originating from a content inventory.

29. The system of claim 17, wherein the initial content is video content and the data communications network over which the initial content is retrieved is an IP network.

30. The system of claim 17, wherein the initial content is streamed video content.

31. A non-transitory computer-readable medium containing instructions that, when executed, cause the computing device to:
retrieve, over a data communication network, an initial content in a first format, wherein the initial content includes video;
determine a resource usage requirement associated with delivering the initial content in a converted format to a mobile device, wherein:
the converted format is different than the first format;
the resource usage requirement indicates a delivery cost to deliver the initial content in the converted format over the data communication network, and
the delivery cost is calculated based on:
a data size of the initial content in the converted format, and
a mobile network operator charge for delivering data over the data communication network;
upon a determination that the delivery cost does not exceed a monetary amount specified by an information provider for delivery of content to the mobile device, convert the initial content to the converted format; and
transmit a message including the initial content in the converted format to the mobile device.

32. The non-transitory computer-readable medium of claim 31, wherein converting the initial content includes selectively editing the initial content by compressing select portions of the video content and discarding unnecessary portions of the video content.

33. The non-transitory computer-readable medium of claim 31, wherein the message further comprises transmission data identifying the mobile device, for transmission of the message to the mobile device.

34. The non-transitory computer-readable medium of claim 31, wherein the instructions further cause the computing device to:
generate the message for transmission to the mobile device.

35. The non-transitory computer-readable medium of claim 31, wherein the instructions further cause the computing device to:
analyze capabilities of the mobile device, wherein the initial content is converted only if the mobile device is capable of receiving and processing the initial content in the converted format.

36. The non-transitory computer-readable medium of claim 31, wherein the instructions further cause the computing device to:

compare the data size of the initial content in converted format with a maximum data size that the mobile device is capable of receiving and processing, wherein the initial content is converted only if the mobile device is capable of receiving and processing the initial content in converted format.

37. The non-transitory computer-readable medium of claim 31, wherein the instructions further cause the computing device to:

analyze network resources of the data communication network, wherein the initial content is converted only if network resources for transmitting the message are available.

38. The non-transitory computer-readable medium of claim 31, wherein the instructions further cause the computing device to:

analyze message preference settings stored in a user profile of the mobile device, wherein the initial content is converted only if transmission of the message to the mobile device complies with the message preference settings.

39. The non-transitory computer-readable medium of claim 31, wherein the instructions further cause the computing device to:

analyze one or more parameters related to a user profile associated with the mobile device, wherein the initial content is converted only if the initial content relates, in a predetermined manner, to the one or more parameters.

40. The non-transitory computer-readable medium of claim 31, wherein the instructions further cause the computing device to:

determine a geographical location of the mobile device, wherein the initial content is converted only if the mobile device is within a predetermined area.

* * * * *